United States Patent Office 2,707,193
Patented Apr. 26, 1955

2,707,193

3,3,5-TRIMETHYL CYCLOHEXANOL-1 MANDELATE

Wijbe Thomas Nauta, Amsterdam, Netherlands, assignor to N. V. Koninklijke Pharmaceutische Fabrieken Voorheen Brocades-Stheeman & Pharmacia, Amsterdam, Netherlands, a company of the Netherlands No Drawing. Application March 8, 1954, Serial No. 414,881

Claims priority, application Netherlands June 7, 1949

1 Claim. (Cl. 260—473)

This application is a continuation-in-part of my U. S. application Ser. No. 166,295, filed June 5, 1950, now abandoned.

Papaverine, i. e. 1-(3',4'-dimethoxybenzyl) 6.7-dimethoxy iso-quinoline, has been in use for a considerable time as a spasmolytic. A great many attempts have been made to find other spasmolytics; a summary was published by Blicke in Annual Review of Biochemistry, 13, 549–574 (1944). From this it is clear that besides amines and amides the substances attracting special attention were esters, among them esters of di-substituted acetic acids. These esters invariably contain basic nitrogen in the alcohol component. It has also been described in the literature that the piperidino-ethanol ester of di-n-butyl acetic acid is an excellent spasmolytic.

It has now been found that the 3.3.5-trimethylcyclohexanol-1 ester of mandelic acid exhibits a spasmolytic activity which is significantly surpassing that of papaverine. A great advantage consists further in that the toxicity of the said compound is small as compared with that of papaverine. Thus the $LD_{50}$ for papaverine is 150 mg. and that of the 3.3.5-trimethylcyclohexanol-1 ester of mandelic acid about 4000 mg. both per kg. mouse and administered subcutaneously.

The ester described above is a novel compound.

It appeared to make little difference whether the laevo- or dextro-rotatory form of mandelic acid was used or dl-mandelic acid.

Several esters of mandelic acid were already known per se, they are the methyl, ethyl, propyl, iso-butyl, 2-methyl, butyl, n-hexyl, benzyl, menthyl and bornyl esters. I had these esters tested and found that as to their spasmolytic activity they are significantly inferior to that of the 3.3.5-trimethylcyclohexanol-1 ester, as follows from the table below:

| Alcohol component | Mandelic acid | B. P. or M. P. of the ester | Antagonistic to spasms provoked in the isolated Guinea pig intestine by acetyl choline; calculated per grammol |
|---|---|---|---|
| 3.3.5-trimethylcyclohexanol-1. | dl | 50–53° C.; 192–194° C./14 mm. (lower melting form). 63–66° C.; 154–155° C./1 mm. (higher melting form). | 100 |
| methanol | dl | 57° C.; 137° C./16 mm | 0.3 |
| ethanol | dl | 33–34° C.; 138–141° C./14 mm. | 0.7 |
| propanol-1 | dl | 150° C./21 mm | 2.4 |
| butanol-2 | dl | 141–142° C./12 mm | 4.5 |
| 2-methylbutanol-1 | dl | 165° C./ 20 mm | 25 |
| benzylalcohol | dl | 90–91° C | 22 |
| l-menthyl-alcohol | dl | 81–82° C | <50 |
| l-bornyl-alcohol | dl | 78° C | (¹) |
| papaverine | dl |  | 27 |

¹ Intestine damaged by the ester; this ester is not so much a spasmolytic, but more a paralyzing drug, so that it cannot be used in practice as a spasmolytic. Accordingly, this measurement of its spasmolytic activity is not accurate; at all events it is considerably less than that of the 3.3.5-trimethylcyclohexanol-1 ester.

The activity of the 3.3.5-trimethyl cyclohexanol-1 ester has been put at 100.

The following is an example of the production of the ester claimed by means of esterification:

50 g. of dl-mandelic acid are heated for 6 hours at approximately 100° C. with 50 g. of 3.3.5-trimethyl cyclohexanol (mixture of cis- and trans-isomer), while passing dry hydrochloric acid gas through the mixture. The reaction product is subsequently poured out into water. After neutralization with potassium bicarbonate the ester is extracted with ether. The ether extract is dried with sodium sulphate, the ether is distilled off and the residue is distilled in vacuo. The fraction, which has a boiling point of 192–194° C. at 14 mm., consists of the 3.3.5-tri-methylcyclohexyl ester of mandelic acid, which is obtained in a yield of about 70%.

The liquid solidifies to a colourless solid substance having a melting point of 50–53° C.

What I claim is:

The 3.3.5-trimethylcyclohexanol-1 ester of mandelic acid.

No references cited.